United States Patent

Ikehira et al.

(10) Patent No.: US 7,784,091 B2

(45) Date of Patent: Aug. 24, 2010

(54) DATA PROCESSING SYSTEM

(75) Inventors: Kimimasa Ikehira, Kanagawa (JP); Masatoku Ohtsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1070 days.

(21) Appl. No.: 11/319,475

(22) Filed: Dec. 29, 2005

(65) Prior Publication Data

US 2007/0169193 A1 Jul. 19, 2007

(30) Foreign Application Priority Data

Jan. 21, 2005 (JP) ............................ 2005-014817

(51) Int. Cl.

*G06F 21/00* (2006.01)
*G06F 7/04* (2006.01)
*G06F 17/30* (2006.01)
*H04L 9/32* (2006.01)

(52) U.S. Cl. ............................ 726/7; 726/20; 713/185

(58) Field of Classification Search ...................... None
See application file for complete search history.

(56) References Cited

U.S. PATENT DOCUMENTS 5,933,515 A * 8/1999 Pu et al. .................... 382/124
6,332,193 B1 * 12/2001 Glass et al. ................ 713/170
6,496,595 B1 * 12/2002 Puchek et al. .............. 382/124
6,636,973 B1 * 10/2003 Novoa et al. .................. 726/20
7,200,753 B1 * 4/2007 Shinzaki et al. ............. 713/182
7,225,338 B2 * 5/2007 Khan et al. ................. 713/186
7,310,734 B2 * 12/2007 Boate et al. ................. 713/186
7,391,891 B2 * 6/2008 Hillhouse ................... 382/124
7,400,749 B2 * 7/2008 Hillhouse ................... 382/124
7,404,086 B2 * 7/2008 Sands et al. ................ 713/186
7,502,761 B2 * 3/2009 Siegal et al. .................. 705/67
2003/0088782 A1 * 5/2003 Forrest ...................... 713/186
2005/0165907 A1 7/2005 Ikehira et al.

FOREIGN PATENT DOCUMENTS

JP 6-32109 4/1994
JP 7-3130 1/1995
WO WO 02/089018 A1 * 11/2002

* cited by examiner

*Primary Examiner*—Christopher A Revak
(74) *Attorney, Agent, or Firm*—Oblon, Spivak, McClelland, Maier & Neustadt, L.L.P.

(57) ABSTRACT

A data processing system is disclosed that includes a read unit configured to read unique information identifying an individual from an individual identification medium, an input unit configured to capture the unique information read by the read unit and convert the unique information into digital unique information, and a database unit having digital unique information registered beforehand which database unit is configured to register the digital unique information captured and converted by the input unit. A managing process is performed on the digital unique information captured and converted by the input unit that involves comparing and organizing the digital unique information captured and converted by the input unit and the digital unique information registered in the database unit according to a predetermined rule, and registering the organized digital unique information in the database unit, the registered digital unique information being output to a predetermined output unit.

17 Claims, 8 Drawing Sheets

FIG.5

| CARD READER DATA READING | PERSONNEL MANAGEMENT INFORMATION | COMPANY NAME | EMPLOYEE ID NUMBER | GENDER | MANE IN KANJI CHARACTERS |
|---|---|---|---|---|---|
| (A) NUMBER=10001 → | 1 00023 | TOKKYO | B123456 | 1 | 特許太郎 |
| | a:UNNECESSARY INFORMATION | NECESSARY INFORMATION FOR CONFIRMING DATA AUTHENTICITY | | a:UNNECESSARY INFORMATION | NECESSARY INFORMATION AS REFERENCE DATA |

(B) b:QUERY MASTER DATABASE USING EMPLOYEE ID NUMBER

DATA TO BE PASSED ON TO NEXT STEP: TOKKYO B123456 特許太郎

QUERY

MASTER DATABASE
(DIGITAL PERSONAL INFORMATION REGISTERED BEFOREHAND)

| ID | NAME/KANJI | NAME/KANA | COMPANY NAME | POST | EMPLOYED DATE | E-MAIL ADDRESS | EXPIRATION DATE |
|---|---|---|---|---|---|---|---|
| A123456 | 特許次郎 | とっきょ じろう | TOKKYO | HQ | 2002/04/01 | jiro@tokkyo.jp | 06/03 |
| B123456 | 特許太郎 | とっきょ たろう | TOKKYO | FACTORY | 2001/04/01 | taro@tokkyo.jp | 02/03 |
| B123456 | 特許太郎 | とっきょ たろう | TOKKYO | FACTORY | 2001/04/01 | taro@tokkyo.jp | 06/03 |

RETURN QUERY RESULT (ONLY UNDERLINED ITEMS)

(C) c:WHEN PLURAL ENTRIES WITH THE SAME ID NUMBER EXIST, SELECT THE ENTRY WITH THE MOST RECENT DATE

⇩

B123456 特許太郎 とっきょ たろう TOKKYO FACTORY

FIG.6

(1) COMPOSED DATA—REGISTER IN DATABASE

10001 特許太郎 とっきょ たろう TOKKYO FACTORY taro@tokkyo.jp 2003/01/15 13:25

(2) SCREEN DISPLAY DATA—SORT BY TIME AND DISPLAY ON SCREEN

CURRENT TOTAL NUMBER OF ATTENDEES: 250 AS OF JANUARY 15, 2003, 1:25 PM

| SITE | NAME/ KANJI | NAME/ KANA | COMPANY NAME | POST | E-MAIL ADDRESS | TIME/DATE OF ENTRANCE |
|---|---|---|---|---|---|---|
| EVENT SITE 1 | 特許次郎 | とっきょ じろう | TOKKYO | FACTORY | jiro@tokkyo.jp | JAN 15,2003 1:15 PM |
| EVENT SITE 1 | 特許太郎 | とっきょ たろう | TOKKYO | FACTORY | taro@tokkyo.jp | JAN 15,2003 1:25 PM |

DATA PROCESSING SYSTEM

BACKGROUND OF THE INVENTION

1. Field of the Invention

The present invention relates to a data processing system for effectively performing access control over individuals entering or exiting a site while improving workability of such a system.

2. Description of the Related Art

In recent years and continuing, security control is becoming a major concern, and proper security measures are demanded for access control systems implemented in personal residences and corporate establishments, for example.

In turn, an access control system for controlling access of individuals using an ID code or an ID card, and controlling the locking/unlocking of an electrical lock is proposed in Japanese Laid-Open Patent Publication No. 6-32109, for example.

Also, a security system access control method using five different types of access control levels including an ID card, a security code, a lock, a free pass, and a security sensor, and changing the access control level(s) used according to different time zones to improve usability is proposed in Japanese Laid-Open Patent Publication No. 7-3130, for example.

It is noted that the above-described techniques are mainly directed at preventing the entrance of suspicious or unwarranted individuals. Such techniques are not adapted for managing and compiling information on individuals entering and exiting an indoor/outdoor site (e.g., an event site or fairground). Accordingly, there is demand for a technique for effectively performing access control over individuals entering or exiting a site and compiling information pertaining to such individuals.

Specifically, in recent years and continuing, large-scale events and fairs are becoming quite popular. Typically, in such events, individuals entering and exiting the event site are required to fill out forms provided at a reception desk, for example. However, in this case, the reception desk may be congested with such individuals. Also, information such as the number of individuals having entered the site and the number of individuals having exited the site, for example, may not be immediately determined. In the case of compiling information on the individuals having attended the event, information such as the names of these individuals have to be transferred to a compiling sheet or a computer, for example. Such compiling procedures are disadvantageous with respect to workability.

Also, it is noted that the implementation of security control measures within rooms and halls that use computers and office machines is becoming increasingly important. Also, techniques are in demand for keeping track of actions of individuals through simple means such as the use of ID cards. Further, states and regional communities are starting to introduce the use of IC cards for personal identification to build a new social infrastructure, and progress is being made in accumulating and managing personal data.

SUMMARY OF THE INVENTION

The present invention provides a data processing system for properly realizing security control and enabling management and compilation of information pertaining to persons entering/exiting a certain site through easy and efficient procedures.

According to one embodiment of the present invention, a data processing system is provided that includes:

a read unit configured to read unique information identifying an individual from an individual identification medium that stores such unique information;

an input unit configured to capture the unique information read by the read unit and convert the unique information into digital unique information; and a database unit having digital unique information registered beforehand which database unit is configured to register the digital unique information captured and converted by the input unit;

wherein a managing process is performed on the digital unique information captured and converted by the input unit, the managing process involving comparing and organizing the digital unique information captured and converted by the input unit and the digital unique information registered in the database unit according to a predetermined rule, and registering the organized digital unique information in the database unit, the registered digital unique information being output to a predetermined output unit.

According to a preferred embodiment of the present invention, the database unit is arranged at a remote location with respect to the read unit and the input unit, and the database unit and the input unit are connected by a predetermined communication mechanism.

According to another preferred embodiment, the data processing system of the present invention further includes:

an input side database unit arranged within or near the input unit which input side database unit is configured to store the digital unique information captured by the input unit;

wherein the digital unique information captured by the input unit is transmitted to the database unit via the communication mechanism, and stored in the input side database unit; and when the input side database unit and the database unit are connected, the digital unique information of the input side database unit and the digital unique information of the database unit are compared automatically or through manual operation, and one or more digital unique information items of the digital unique information of the database unit that are identical to one or more digital unique information items of the digital unique information at the input side database unit are stored in the database unit.

According to another preferred embodiment, the data processing system of the present invention further includes:

an input side database unit configured to store the digital unique information captured by the input unit;

wherein the input side database unit is connected to the database unit via the connection mechanism, the digital unique information of the input side database unit is compared with the digital unique information of the database unit at predetermined time intervals, and the digital unique information of the database unit is arranged to match the digital unique information of the input side database unit.

According to another preferred embodiment, the data processing system of the present invention further includes:

an input side database unit configured to store the digital unique information captured by the input unit;

wherein when the input side database unit is connected to the database unit and the database unit detects a predetermined change, the database unit sends a request to the input side database unit for the digital unique information of the input side database unit, and arranges the digital unique information of the database unit to match the digital unique information of the input side database unit.

According to another preferred embodiment of the present invention, the read unit is configured to read the unique information, and the input side database unit is configured to store the digital unique information corresponding to the unique information read by the read unit and captured by the input unit when the connection between the input side database unit and the database unit is disabled; and the digital unique information of the input side database unit and the digital unique information of the database unit are compared, and the digital unique information of the database unit is arranged to match the digital unique information of the input side database unit when communication between the input side database unit and the database unit is enabled.

According to another preferred embodiment, the data processing system of the present invention further includes:

plural input units and plural input side database units arranged at the input units;

wherein the respective digital unique information of the input side database units are compared with each other at predetermined time intervals and arranged to be identical with each other; and the identical digital unique information of the input side database units and the digital unique information of the database unit are compared at predetermined time intervals, and the digital unique information of the database unit is arranged to match the identical digital unique information of the input side database units.

According to another preferred embodiment of the present invention, the read unit and the input unit are serially connected, and the input unit and the database unit are connected via an Ethernet network.

According to another preferred embodiment, the data processing system of the present invention further includes:

plural input units that are connected to the same network;

wherein the input side database is connected to the same network to which the input units are connected; and the digital unique information of the input side database unit and the digital unique information of the database unit are compared, and information items of the digital unique information of the database unit that are identical to information items of the digital unique information of the input side database unit are stored in the database unit.

According to another preferred embodiment, the data processing system of the present invention further includes:

a display unit arranged near the database unit which display unit is configured to establish communication with the input side database unit of the input unit and display the digital unique information stored in the input side database unit.

According to another preferred embodiment of the present invention, the input unit is configured to add input side identification data to the digital unique information corresponding to the unique information read by the read unit and digitally converted by the input unit, the input side identification data identifying the input unit or the read unit.

According to another preferred embodiment of the present invention, the read unit and the input unit are arranged near a door at an entrance of an access controlled room;

the read unit is operated by the individual to read the unique information from the individual identification medium;

the database unit is configured to receive the digital unique information corresponding to the unique information read by the read unit and digitally converted by the input unit, and transmit a superposed signal superposing an audio signal and an operations signal to the input unit; and the input unit is configured to output guidance information based on the audio signal of the superposed signal, and lock/unlock the door based on the operations signal of the superposed signal.

BRIEF DESCRIPTION OF THE DRAWINGS

FIG. 5 is a diagram illustrating personal information data processing performed according to a predetermined rule that is realized by the data processing system of FIG. 1;

FIG. 6 is a diagram illustrating data organization processing realized by the data processing system of FIG. 1;

DESCRIPTION OF THE PREFERRED EMBODIMENTS

In the following, preferred embodiments of the present invention are described with reference to the accompanying drawings. It is noted that the embodiments described below include certain technical features as preferred embodiments for realizing the present invention. However, the present invention is not limited to such embodiments, and is limited only by the scope of the claims.

Figure 1:
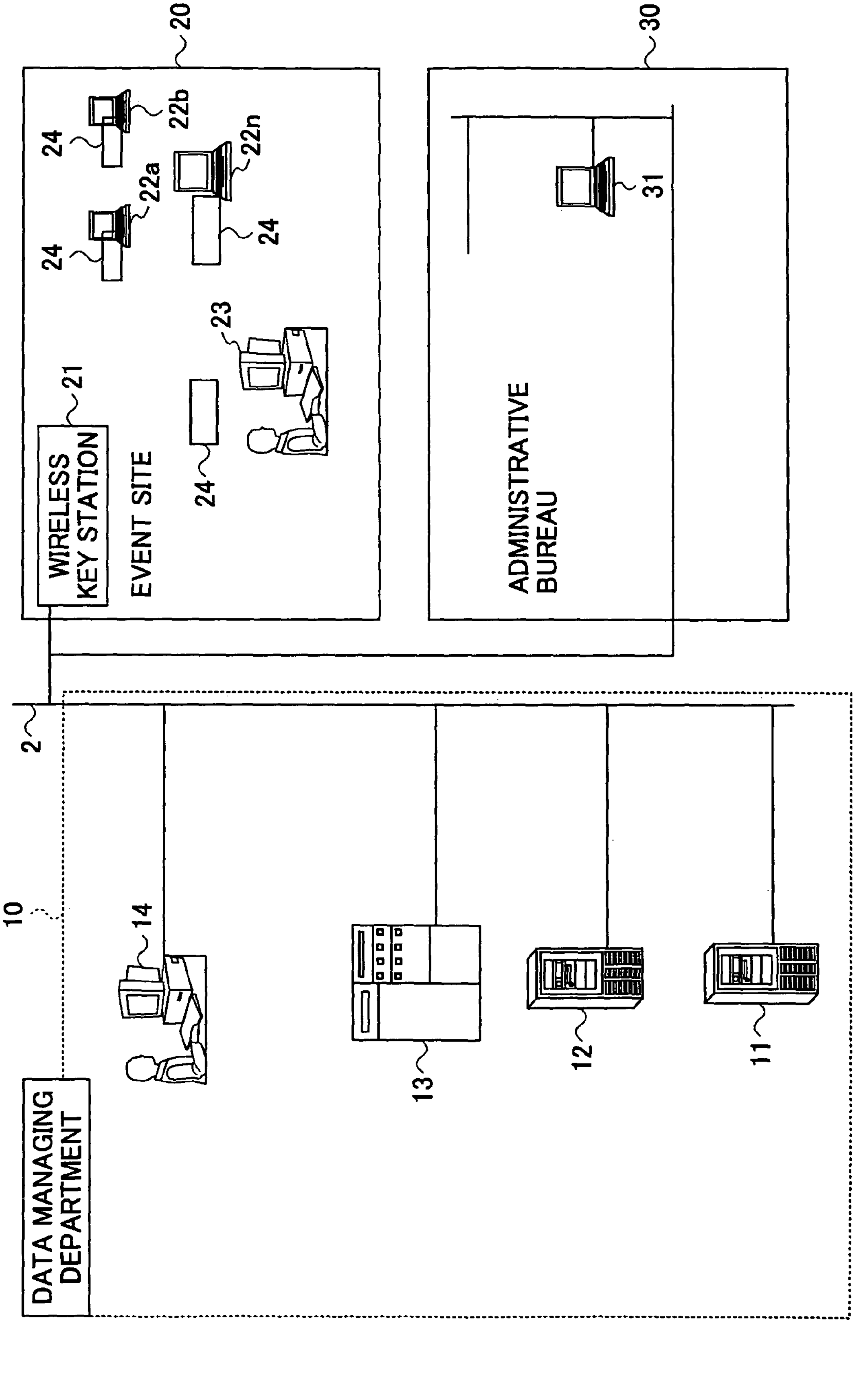
FIG. 1 is a diagram showing an exemplary configuration of a data processing system according to an embodiment of the present invention.

FIG. 1 is a diagram showing a configuration of a data processing system 1 according to an embodiment of the present invention.

In FIG. 1, the data processing system 1 includes a data managing department 10, an event site 20, and an event administrative bureau 30 that are interconnected via a network (communication mechanism) 2 such as a LAN (local area network) or a WAN (wide area network). In one example, an Ethernet (registered trademark) network that realizes data transmission/reception using packets may be applied as the network 2.

The data managing department 10 includes a data storing server 11, a program storing server 12, a search server 13, and an administrator terminal 14. The servers 11-13 and the administrator terminal 14 are interconnected via a network.

The data storing server 11 as an embodiment of a database unit of the present invention is configured to store digital data pertaining to individuals subject to management as digital personal information (digital unique information). In one example, a SQL (structured query language) sentence may be used as a data definition format for the digital personal information. The digital personal information may include a name (e.g., in kanji characters and in kana characters) of an individual subject to management; a name of a company, a department, and a post to which the individual is assigned; and a phone number, an e-mail address, and a card number of the individual, for example.

The program storing server 12 is configured to store one or more data processing programs for executing data processes according to one or more embodiments of the present invention, and system data for executing such data processing programs. It is noted that the data processing system 1 executes data processing based on the data processing programs stored in the program storing server 12.

The search server 13 is configured to search the digital personal information stored in the data storing server 11 based on various search conditions in response to a search request from the administrator terminal 14, the event administrative bureau 30, or a terminal stationed at the event site 20, and convey the search result to the terminal corresponding to the issuer of the search request.

The administrator terminal 14 may be a personal computer (e.g., laptop computer) that is configured to perform various operations to enable the administrator of the data processing system 1 to control the data processing system 1. It is noted that displays of the data storing server 11, the program storing server 12, the search server 13, and the administrator terminal 14 may realize a display unit of the present invention according to one embodiment that is arranged in the vicinity of the data storing server 11. Also, the data storing server 11 realizes an embodiment of a database unit of the present invention.

Figure 2:
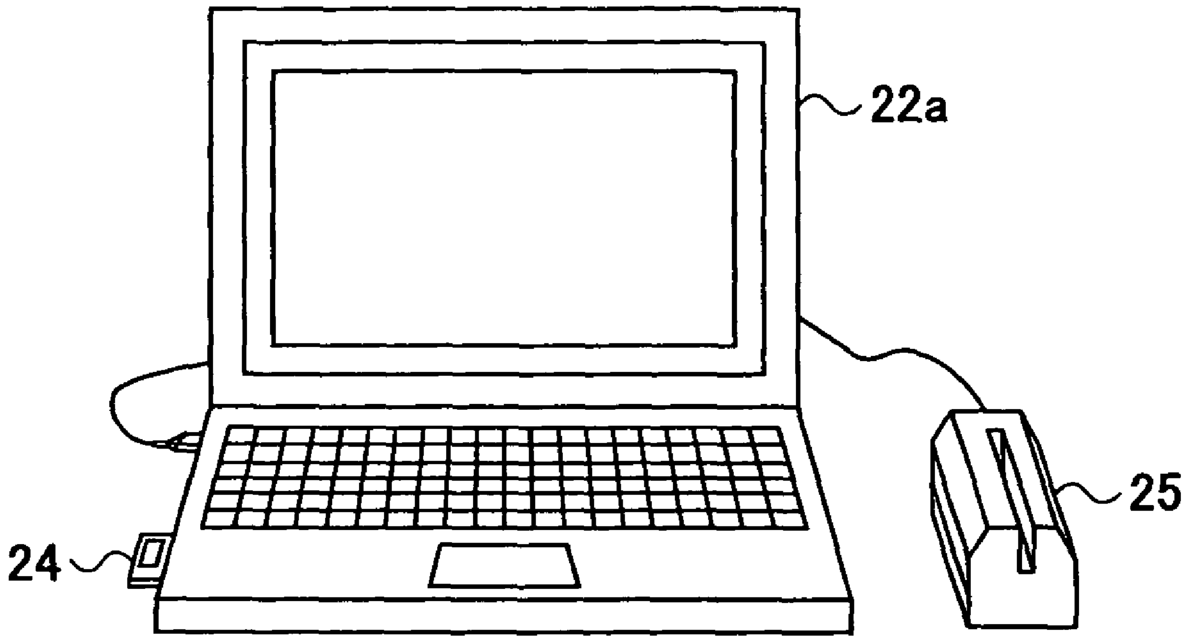
FIG. 2 is a front view of a reception terminal and a magnetic card reader used in the data processing system of FIG. 1.

The event site 20, which is situated at a remote location from the data managing department 10, includes a wireless key station 21, plural reception terminals 22*a* through 22*n* (collectively referred to as "reception terminal 22" hereinafter), and a search terminal 23. According to the present embodiment, the reception terminal 22 and the search terminal 23 each have a wireless LAN access card 24 attached thereto for establishing wireless communication with the wireless key station 21, and is each connected to a magnetic card reader 25. FIG. 2 is a diagram showing the reception terminal 22*a* with the wireless LAN access card 24 and the magnetic card reader 25 as a representative example of the reception terminals 22*a*-22*n*.

According to the present embodiment, the wireless key station 21 is connected to the network 2. The reception terminal 22 is configured to realize data exchange with the wireless key station 21 stationed at the event site 20 through wireless communication via its wireless LAN access card 24. For example, the reception terminal 22 may be configured to transmit acquired data to the wireless key station 21. Also, the reception terminals 22 may be configured to establish communication with each other via the wireless key station 21.

The magnetic card reader 25 as an embodiment of a read unit of the present invention may be serially connected to the reception terminal 22 via a serial interface such as RS232C, for example. In one embodiment, an individual entering or exiting the event site 20 may carry a magnetic card 41 as his/her ID card 40 (see FIG. 3) corresponding to an embodiment of a personal identification medium (individual identification medium), and the magnetic card reader 25 may be configured to read personal information (unique information) of an individual entering or exiting the event site 20 stored in the magnetic card 41 and output the read information to the reception terminal 22.

The reception terminal 22 as an embodiment of an input unit of the present invention may be stationed at a reception desk for receiving individuals entering or exiting the event site 20, for example. In one embodiment, the reception terminal 22 may be configured to input the personal information (unique information) read by the magnetic card reader 25.

The magnetic card 41 is an exemplary type of ID card 40 that may be carried by an individual entering or exiting the event site 20 and has personal information for identifying this individual registered therein. For example, information such as the name of the individual (e.g., in kanji characters and in kana characters); the name of the company, the department, and the post to which the individual is assigned; and the phone number, the e-mail address, and the card number of the individual may be registered in the magnetic card 41. By having the magnetic card reader 25 read the information registered in the magnetic card 41, the read information may be input to the corresponding reception terminal 22*a*-22*n* and transmitted to the data storing server 11 of the data managing department 10 via the wireless LAN access card 24, the wireless key station 21, and the network 2 to be stored in the data storing server 11.

Figure 3:
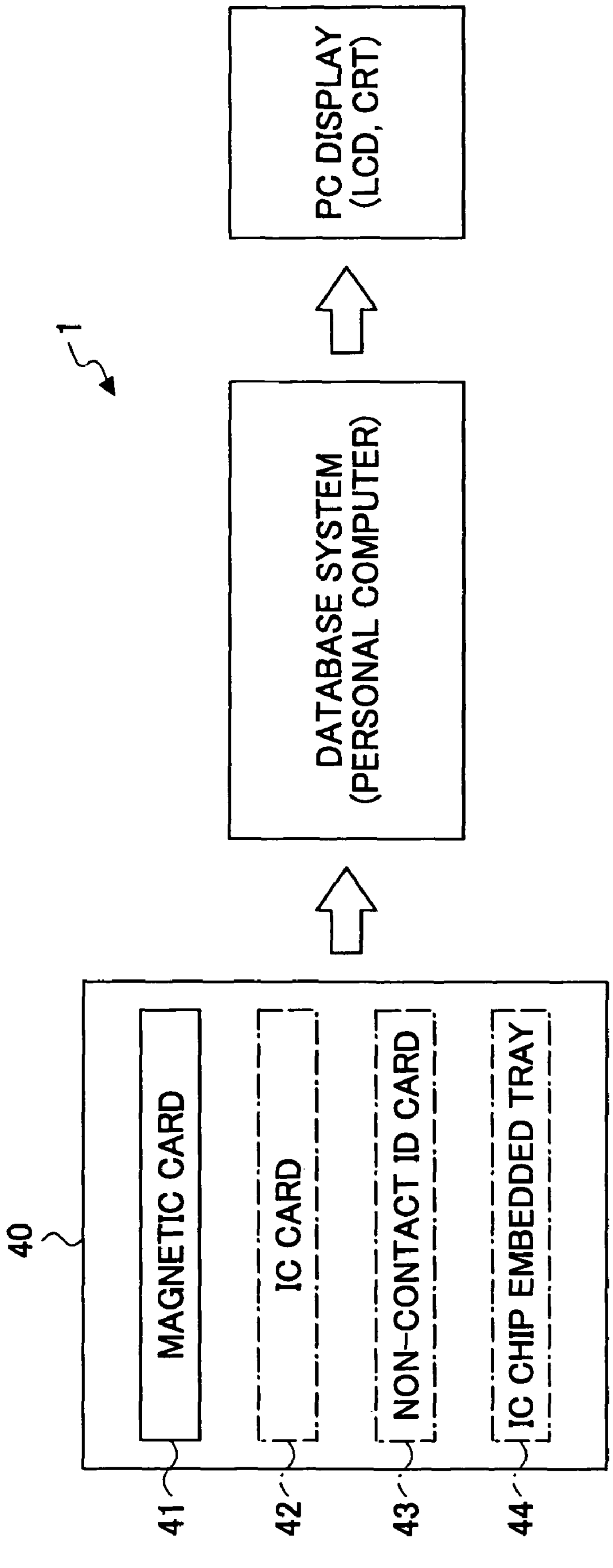
FIG. 3 is a diagram illustrating data processing realized by the data processing system of FIG. 1.

It is noted that the ID card 40 carried by an individual entering or exiting the event site 20 is not limited to the magnetic card 41 as is descried above, and for example, an IC card 42, a non-contact ID card 43, an IC chip embedded tray 44 may also be used as the ID card 40 (see FIG. 3). In such a case, the reception terminal 22 may be connected to other types of readers adapted for reading information from the respective types of ID cards 40. For example, the reception terminal 22 may be connected to an IC card reader and/or a non-contact ID card reader.

According to the present embodiment, the reception terminal 22 is configured to digitally convert the personal information read from the magnetic card 41 into digital personal information (digital unique information), and transmit the digital personal information via the network 2 to the data storing server 11 of the data managing department 10.

The search terminal 23 may be a personal computer such as a laptop computer having the wireless LAN access card 24 attached thereto, for example. The search terminal is configured to access the data storing server 11 via the wireless LAN access card 24, the wireless key station 21, and the network 2, search for the status of an individual entering or exiting the event site 20, and display the search result at a display, for example.

The administrative bureau 30 includes a status monitoring terminal 31 which may be a personal computer such as a laptop computer, for example. The status monitoring terminal 31 is connected to the network 2, and is configured to access the data storing server 11 of the data managing department 10 via the network 2, search for the status of an individual entering or exiting the event site 20, and display the search result at a display, for example.

In the following, operations of the data processing system 1 are described. The data processing system 1 of the present embodiment may be applied in various types of events and fairs as a reception system connected to a wireless LAN in which the reception terminal 22 including the wireless LAN access card 24 and the magnetic card reader 25 is stationed at the event site 20, and the wireless key station 21 at the event site 20 is connected to the network 2 of the data processing system 1.

In the data processing system 1 of the present embodiment, database for managing information pertaining to an individual entering or exiting the event site 20 is stored in the data storing server 11 of the data managing department 10 that is connected to the event site 20 via the network 2.

The reception terminal 22 having the wireless access card 24 attached thereto for establishing wireless communication with the wireless key station 21 is stationed at the event site 20, and an ID card reader such as the magnetic card reader 25 is connected to the reception terminal 22.

In one embodiment, the magnetic card reader 25 stationed at the event site 20 may read the magnetic card 41 corresponding to an ID card 40 carried by an individual entering or exiting the event site 20.

Figure 4:
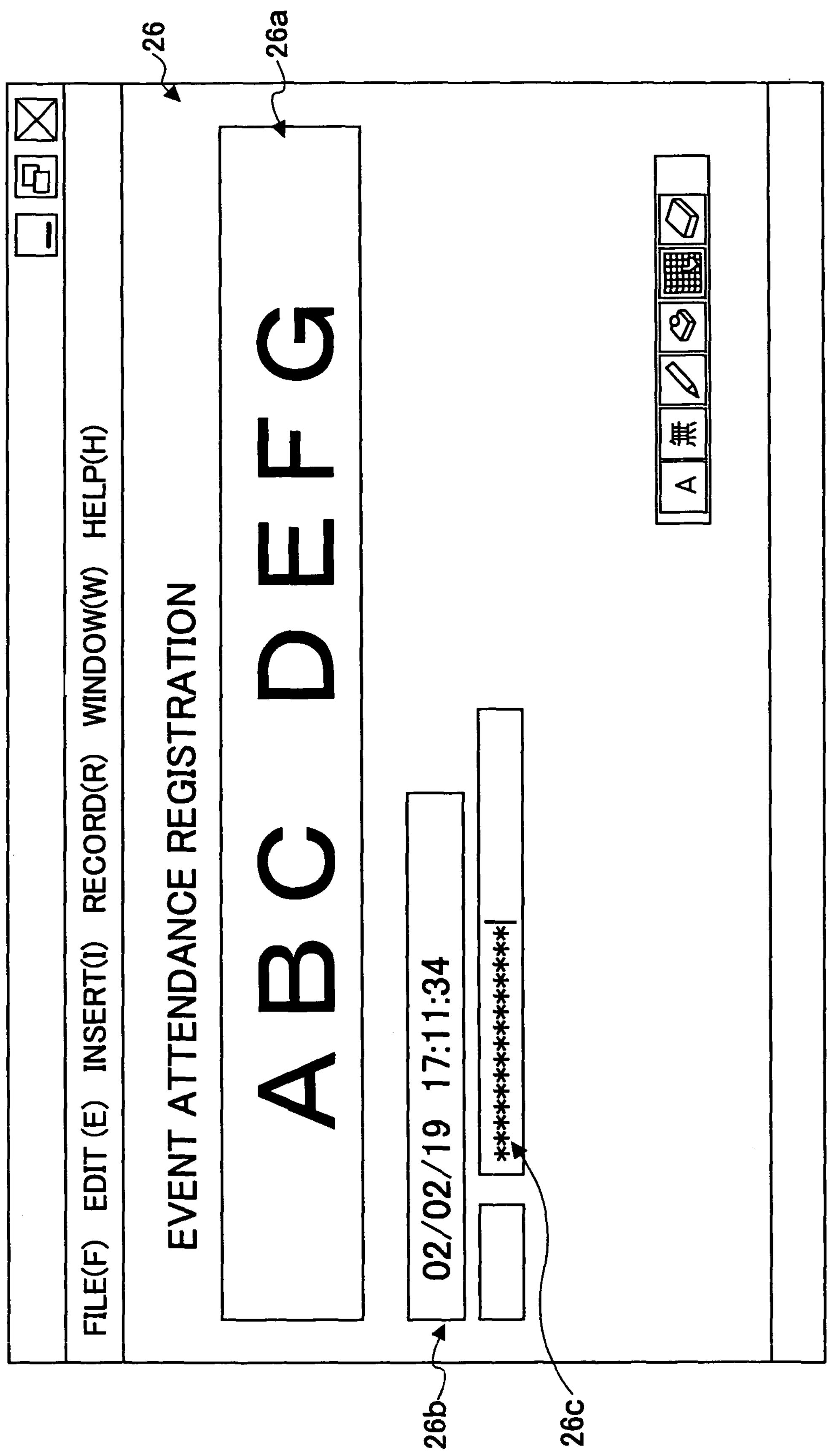
FIG. 4 is a diagram illustrating an exemplary display image shown on a display screen of the reception terminal of FIG. 2.

After accurately reading the personal information recorded on the magnetic card 41, the magnetic card reader 25 may generate a read completion notification signal such as a sound signal for signaling the completion of the read operation. According to one embodiment, as is shown in FIG. 4, the reception terminal 22 may include a display screen 26 that displays a name column 26*a*, a date column 26*b*, and an input waiting indication column 26*c*. In this embodiment, a predetermined mark such as an asterisk mark (*) may be displayed at the input waiting indication column 26*c* while the read operation of the magnetic card 41 is performed, and after the read operation is completed, the name of the person identified by reading the magnetic card 41 may be displayed at the name column 26*a*, for example.

According to the present embodiment, the reception terminal 22 is configured to display the personal information read from the magnetic card 41 of an individual entering or exiting the event site 20 at the display screen 26. Also, the reception terminal 22 is configured to transmit the personal information read from the magnetic card 41 to the data storing server 11 of the data managing department 10 via the wireless LAN access card 24, the wireless key station 21, and the network 2. In turn, the data storing server 11 is configured to perform a managing process that involves comparing and organizing the digital personal information transmitted from the reception terminals 22 and digital personal information stored in this data storing server 11 beforehand according to a predetermined rule, and registering the organized personal information in the data storing server 11.

In the following, exemplary data processing procedures for comparing and organizing the digital personal information according to a predetermined rule are described in detail with reference to FIGS. 5 and 6.

Referring to FIG. 5, in processing digital personal information corresponding to personal information read by a magnetic card reader 25, the reception terminal 22 may process the digital personal information according to a rule stipulating process steps (a) through (c) described below to be performed in this order.

(a) discard unnecessary information (b) query the data storing server 11 corresponding to the master database using an employee ID number (c) when plural entries with the same ID number are registered, select the entry with the most recent date Specifically, in stage (A) of FIG. 5, given that personal information read by a magnetic card reader 25 identified by a number "10001" includes information items "1 00023" as personnel management information, "TOKKYO" as company name information, "B123456" as employee ID number information, "1" as gender information, and "特許太郎" as kanji character name information; and the personnel management information and the gender information correspond to unnecessary information, the company name information corresponds to necessary information for confirming data authenticity, and the kanji character name information corresponds to necessary information to be used as reference data; the personnel management information and the gender information corresponding to unnecessary information may be discarded. Then, in stage (B), a query may be made with respect to the data storing server 11 using the employee ID number ("B123456").

Then, in stage (C), when plural personal information entries with the same employee ID number are registered in the data storing server 11, the personal information entry with the most recent date is selected and unnecessary information is deleted from the selected personal information entry to generate data as the query result.

In the following, data processing procedures for organizing the digital personal information are described with reference to FIG. 6. In the illustrated example of FIG. 6, the personal information organizing process is realized by performing process steps (d) through (h) described below in this order.

(d) acquire information on the date/time the personal information has been read and add the acquired information to data (e) add the ID number information of the magnetic card reader 25 to the data (f) compose original data and register the original data in the database (g) compose display screen data to be viewed by an operator at the event site 20

(i) convert the magnetic card reader 25 number information into a corresponding site name by referring to a table associating the magnetic card reader 25 with a site name (ii) change the display format of time/date information (iii) when the same individual enters/exits the site plural times, discard overlapping data to make a single count of the individual (i.e., to avoid making plural counts of the same individual)

(iv) count the current total number of people admitted into the site and display the count data (v) sort data by time, kana character, department, or some other attribute and display the sorted data (vi) arrange data to be writable in a file format adapted for processing by spreadsheet software such as Excel (registered trademark) in view of possible data processing in the future (h) display the display screen data on a designated display at an arbitrary timing In one specific example, personal information corresponding to data describing a magnetic card reader 25 number as "10001", a kanji character name as "特許太郎", a kana character name as "とっきょ たろう", a company name as "TOKKYO", an assigned post as "factory", an e-mail address as "taro@tokkyo.jp", and time/date as "Jan. 15, 2003 13:25" may be registered in the data storing server 11 (see stage (1) of FIG. 6). In this case, the above process steps (d) through (h) may be performed in this order on the personal information to organize and generate screen display data (see stage (2) of FIG. 6). The screen display data may be registered in the data storing server 11 on one hand, and on the other hand, the screen display data may be sorted by time, for example, to be displayed on a designated display.

When a search request or a compile request to search for or compile information pertaining to one or more individuals entering or exiting the event site 20 is issued at the search terminal 23 stationed at the event site 20, the data storing server 11 may be accessed via the wireless LAN access card 24 attached to the search terminal 23, the wireless key station 21, and the network 2 to conduct a search for information pertaining to the status of the entering and exiting individuals, and the search result or the compilation result may be displayed at a display of the search terminal 23.

When a search request or a compile request to search for or compile information pertaining to one or more individuals entering or exiting the event site 20 is issued at the status monitoring terminal 31 at the administrative bureau 30, the data storing server 11 may be accessed via the network 2 to which the status monitoring terminal 31 is connected to conduct a search for information pertaining to the status of the entering or exiting individuals, and the search result or the compilation result may be displayed at a display of the status monitoring terminal 31.

As can be appreciated from the above descriptions, in the data processing system 1 according to an embodiment of the present invention, the magnetic card reader 25 is configured to read personal information (unique information) from a magnetic card 41 corresponding to a personal identification medium (individual identification medium) storing personal information (unique information) for identifying an individual (e.g., an individual entering or exiting a site), the reception terminal 22 as an input unit is configured to capture the personal information read by the magnetic card reader 25 and convert the read personal information into digital personal information, and the data storing server 11 as a database unit is configured to register the digital personal information captured by the reception terminal 22 as database. Upon registering the digital personal information captured by the reception terminal 22, the data storing server 11 is configured to perform a managing process that involves comparing and organizing the digital personal information corresponding to the personal information read by the magnetic card reader 25 and digitally converted by the reception terminal 22 and digital personal information that is registered in the data storing server 11 beforehand according to a predetermined rule, and registering the organized digital personal information, and the data storing server 11 is configured to output the organized digital personal information to a predetermined output unit such as a display.

According to one aspect of the present embodiment, forms do not have to be filled out by individuals entering or exiting a site, and information entries from such forms do not have to be input to a computer, for example. In this way, compiling procedures may be simplified, access control may be efficiently performed, and security measures may be efficiently improved at low cost.

Also, in a preferred embodiment, the data storing server 11 is stationed at the data managing department 10 situated at a remote location from the magnetic card reader 25 and the reception terminal 22, and the data storing server 11 and the reception terminal 22 are connected via the network 2.

According to one aspect of the present embodiment, a large system does not have to be carried into the site at which access control is to be performed, and only the magnetic card reader 25 and the reception terminal 22 having good portability may be carried into the site, for example. In this way, usability may be improved, compiling procedures may be simplified, access control may be efficiently performed, and security measures may be efficiently improved at low cost.

In another preferred embodiment, the magnetic card reader 25 and the reception terminal 22 are serially connected, and the reception terminal 22 and the data storing server 11 are connected via an Ethernet network.

According to one aspect of the present embodiment, the data processing system 1 may be efficiently constructed at a low cost and security measures may be efficiently improved at a low cost.

It is noted that according to one preferred embodiment as is described above, the data storing server 11 is stationed at the data managing department 10, which is situated at a remote location from the event site 20. However, in another embodiment, the data storing server 11 may be configured as a portable computer such as a laptop computer to be stationed at the event site 20.

Also, it is noted that according to one preferred embodiment as is described above, the personal information captured and processed by the reception terminal 22 is immediately transmitted to the data storing server 11 to be stored therein. However, in another embodiment, the personal information acquired by the reception terminal 22 may not be immediately transmitted/stored in the data storing sever 11; rather, the acquired personal information may be stored in a hard disk of the reception terminal, and subsequently, the personal information data of the reception terminal 22 and the personal information data of the data storing server 11 may be cross-checked automatically or in response to operations by an operator so that accurate data may be registered in the data storing server 11, for example. Such an embodiment may be preferred in view of the fact that information written on an ID card other than the ID number may not necessarily be accurate.

In one embodiment, acquired personal information may be stored at the reception terminal 22 and transmitted to the data storing server 11, and subsequently, the personal information data of the reception terminal 22 and the personal information data of the data storing server 11 may be cross-checked so that accurate data may be registered in the data storing server 11.

According to one aspect of the present embodiment, data loss occurring during transmission of the personal information from the remote event site 20 to the data storing server 11 at the data managing department 10 via the network 2 may be corrected. In this way, an accurate database may be constructed, and security measures may be efficiently improved at low cost.

In another embodiment, a personal information database identical to the personal information database of the data storing server 11 may be arranged at the search terminal 23 or at each of the reception terminal 22 and the search terminal 23 stationed at the event site 20. In this embodiment, each time a magnetic card 41 of an individual is read, the read information may be registered in the database at the event site 20, and the database at the event site 20 and the database at the data storing server 11 may be cross-checked at predetermined time intervals and data may be input (registered) to the database of the data storing server 11 in synch with the data register (update) timings of the database at the event site 20, for example.

Figure 7A:
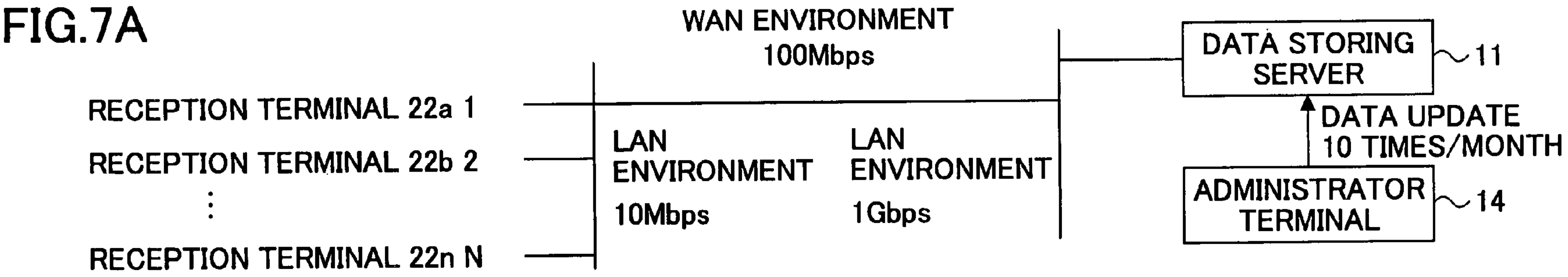
FIG. 7 is a diagram illustrating data update processing performed at predetermined time intervals in the data processing system of FIG. 1.
Figure 7B:
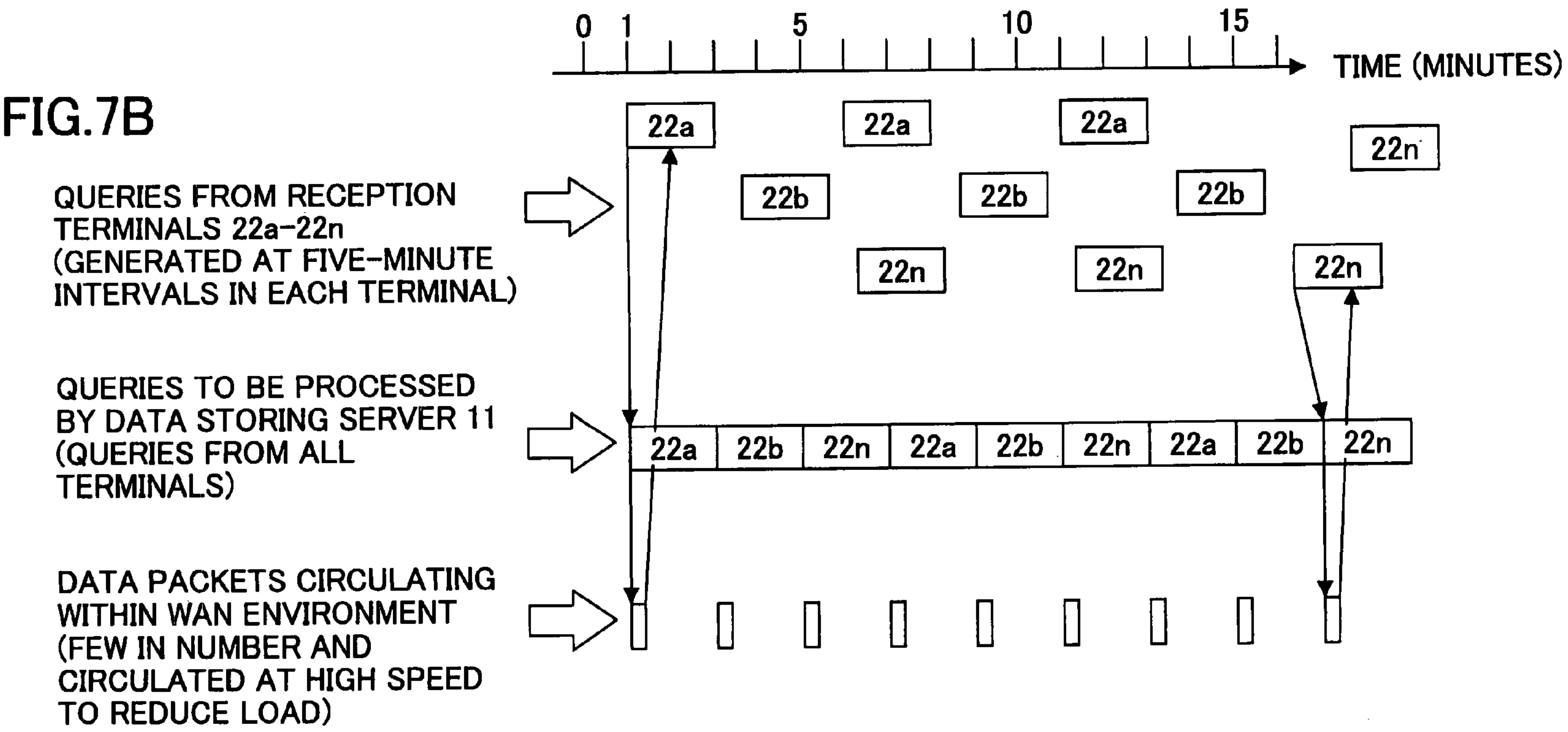

In one specific example, as is shown in FIG. 7A, the reception terminals 22*a*-22*n* at the event site 20 may be in a 10 Mbps LAN environment, the data storing server 11 of the data managing department 10 may be set in a 1 Gbps LAN environment, and the LAN environment of the event site 20 and the LAN environment of the data managing department 10 may be connected by a 100 Mbps WAN environment. In the present example, as is shown in FIG. 7B, each of the reception terminals 22*a*-22*n* may be arranged to query the data storing server 11 at predetermined time intervals such as five-minute intervals. In this way, queries to be processed by the data storing server 11 may be sequentially generated from the reception terminals 22*a* through 22*n* within the LAN environment of the event site 20.

In the WAN environment, query communications from the reception terminals 22*a*-22*n* may be generated at predetermined time intervals, for example.

According to one aspect of the present embodiment, by operating the system under a high speed large capacity communication environment such as a WAN environment or a LAN environment, updating of data stored in the data storing server 11 may be properly and accurately performed even when the data of the reception terminals 22*a*-22*n* are frequently updated. In this way, the latest update information may be acquired by the data storing server 11.

According to another aspect of the present embodiment, a process for data updating at predetermined time intervals is relatively simple in configuration, and a program for executing such an updating scheme may be easily created and implemented.

Thus, by updating data at predetermined time intervals, usability of the system may be easily improved at low cost while enabling construction of an accurate database, and security measures may be efficiently improved at low cost.

In another embodiment, a personal information database identical to the personal information database of the data storing server 11 at the data managing department 10 may be arranged at the search terminal 23 or at each of the reception terminal 22 and the search terminal 23 stationed at the event site 20; each time a magnetic card 41 of an individual is read, the read information may be registered in the database at the event site 20; and when a predetermined change signal is detected at the data storing server 11, the digital personal information of the database of the reception terminals 22 may be compared with the digital personal information of the data storing server 11, and the digital personal information of the data storing server 11 may be arranged to match the digital personal information of the database of the reception terminal 22, for example.

Figure 8A:
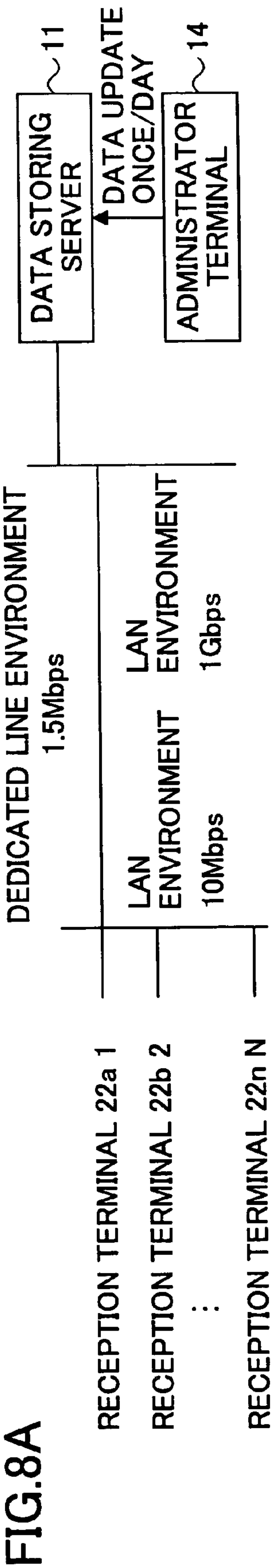
FIG. 8 is a diagram illustrating data update processing performed based on predetermined data change directed to a database unit in the data processing system of FIG. 1.
Figure 8B:
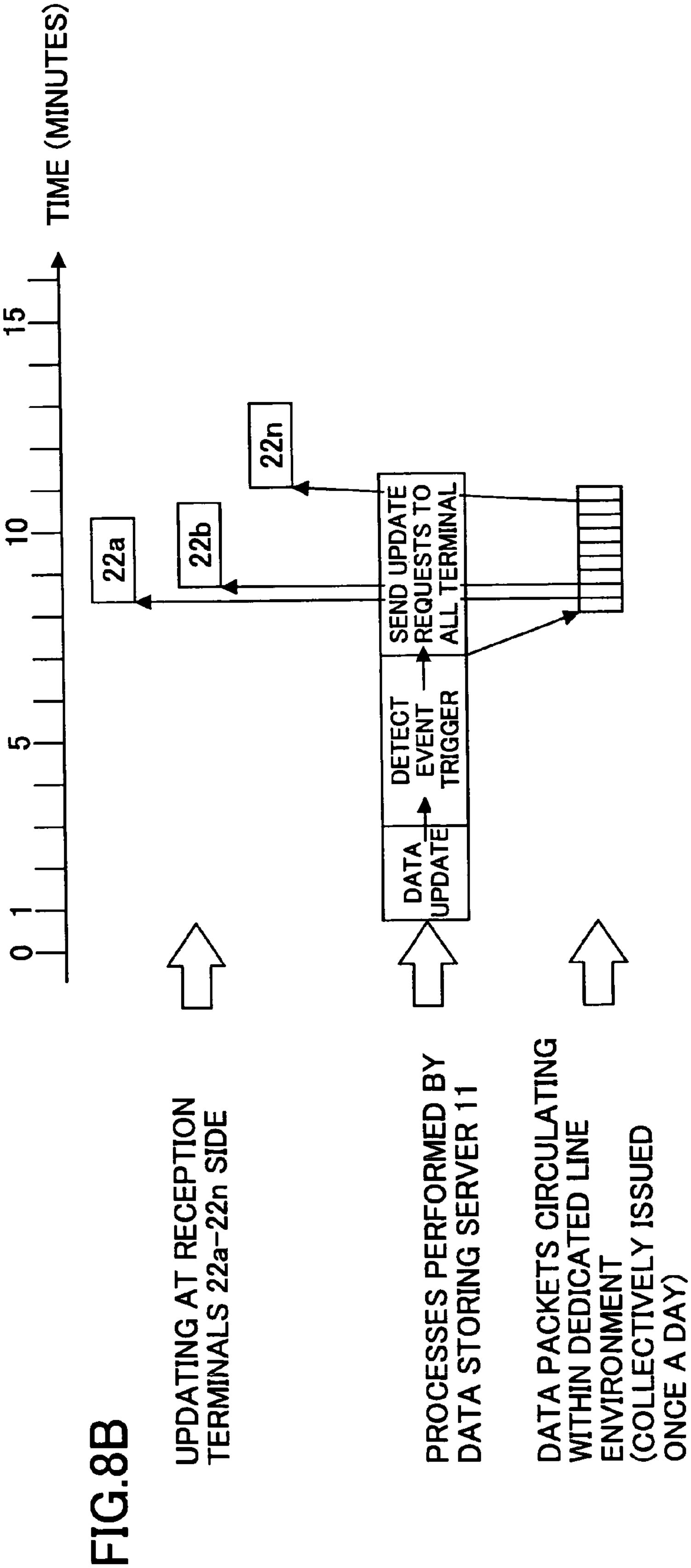

In one specific example, as is shown in FIG. 8A, the reception terminals 22*a*-22*n* at the event site 20 may be in a 10 Mbps LAN environment, the data storing server 11 of the data managing department 10 may be in a 1 Gbps LAN environment, and the LAN environment of the event site 20 and the LAN environment of the data managing department 10 may be connected by a 1.5 Mbps dedicated line environment. In such a case, for example, as is shown in FIG. 8B, when a data update for the data storing server 11 corresponding to a predetermined change to be implemented once a day is generated from the administrator terminal 14, the data storing sever 11 may detect an event trigger for the data update, and send update requests to the reception terminals 22*a*-22*n*, respectively. Then, the data storing server 11 compares the digital personal information stored in the databases at the event site 20 and the digital personal information of the data storing server 11, and upon determining that the digital personal information of the data storing server 11 is different from the digital personal information stored in the databases at the event site, arranges the digital personal information of the data storing server 11 to match the digital personal information stored in the databases at the even site 20.

According to one aspect of the present embodiment, an accurate database may be constructed and effective security measures may be realized while reducing the communication traffic load. Specifically, in the present embodiment, data updating may be performed as is necessary or desired, and thereby, queries being sent to the data storing server 11 may be reduced, and operations may be simplified. Also, the work load on the network may be reduced to realize efficient usage of network resources, system usage may be reduced to avoid blocking other communications, and communication traffic may be reduced to save expenses in a case where a metered charge system is implemented, for example. Further, by reducing the work load of the data storing server 11 as in the example illustrated by FIGS. 8A and 8B, operations may be stabilized even in a low speed communication environment, for example.

In another preferred embodiment, the connection between the data storing server 11 and the database of the reception terminal 22 at the event site 20 may be disabled, and in such a state, the magnetic card reader 25 may be arranged to perform a read operation and the reception terminal 22 may be arranged to capture and process the personal information read by the magnetic card reader 25 to generate and store digital personal information in the database of the reception terminal 22. Then, communication between the database of the reception terminal 22 and the data storing server 11 may be enabled, and at this point, the digital personal information of the data storing server 11 may be compared with the digital personal information of the database of the reception terminal 22 to arrange the digital personal information of the data storing server 11 to match the digital personal information stored in the database of the reception terminal 22.

According to one aspect of the present embodiment, usability of the system may be improved, an accurate database may be constructed, and security measures may be efficiently improved at low cost.

In another preferred embodiment, the reception terminals 22*a*-22*n* may each include a database in their hard disks, for example. The reception terminals 22*a*-22*n* may be arranged to compare the digital personal information stored in their respective databases with each other at predetermined time intervals to arrange the digital personal information stored in the respective databases of the reception terminals 22*a*-22*n* to be identical. Also, the digital personal information stored in the databases of the reception terminals 22*a*-22*n* may be compared with the digital personal information of the data storing server 11 at predetermined time intervals to arrange the digital personal information of the data storing sever 11 to match the digital personal information stored in the databases of the reception terminals 22*a*-22*n*.

According to one aspect of the present embodiment, usability of the system may be improved, an accurate database may be constructed, and security measures may be efficiently improved at low cost.

In another preferred embodiment, the reception terminals 22*a*-22*n* may be connected to the same network, and the databases of the reception terminals 22*a*-22*n* may be connected to the network to which the reception terminals 22*a*-22*n* are connected, the digital personal information stored in the databases of the reception terminals 22*a*-22*n* may be compared with the digital personal information of the data storing server 11 via the network 2, and digital personal information items of the data storing server 11 that are identical to the digital personal information items stored in the databases of the reception terminals 22*a*-22*n* may be stored in the data storing server 11. In another embodiment, a change may be detected through an event trigger corresponding to a data synchronizing request signal automatically generated by the database detecting a change implemented thereon, for example, and in turn, the digital personal information items of the data storing server 11 that are identical to the digital personal information items stored in the databases of the reception terminals 22*a*-22*n* may be stored in the data storing server 11.

In this way, the data processing system 1 may be efficiently constructed at low cost and security measures may be efficiently improved at low cost.

In another preferred embodiment, the display of the data storing server 11, and the displays of the program storing server 12, the search server 13, and the administrator terminal 14 may be arranged in the vicinity of the data storing server to realize a display unit of the data storing server 11, and the digital personal information stored in the databases of the reception terminals 22*a*-22*n* may be acquired via the network 2 and displayed at the display unit.

According to an aspect of the present embodiment, the status of one or more individuals entering or exiting the event site 20 may be determined at the data storing server 11 that is remotely located from the event site 20 so that usability of the system may be improved.

In another preferred embodiment, the reception terminal 22 may be configured to add input side identification data for identifying the corresponding magnetic card reader 25 or the reception terminal 22 to the digital personal information corresponding to the personal information read by the magnetic card reader 25 and digitally converted by the reception terminal 22.

According to an aspect of the present embodiment, the digital personal information may be managed more accurately, and detailed circumstantial information on individuals entering or exiting a site may be acquired so that security may be improved.

In another preferred embodiment, the magnetic card reader 25 and the reception terminal 22 may be stationed near the entrance of a door of an access controlled room. In this embodiment, an individual may input his/her magnetic card 41 to the magnetic card reader 25 to operate the magnetic card reader 25 to read the personal information stored in the input magnetic card 41, and the reception terminal 22 may capture the personal information and convert it into digital personal information. The data storing server 11 may receive the digital personal information converted by the reception terminal 22, and transmit a superposed signal superposing an audio signal and an operations signal to the reception terminal 22. In turn, the reception terminal 22 may output guidance information based on the audio signal of the superposed signal, and may lock/unlock the door of the access controlled room based on the operations signal of the superposed signal.

According to one aspect of the present embodiment, locking/unlocking the door of an access controlled room may be properly and accurately controlled so that security may be improved.

As can be appreciated from the above descriptions, embodiments of the present invention may be applied to a data processing system that realizes adequate security control as well as management and compilation of information pertaining to individuals entering/exiting a specific site including an event site or a fairground as well as an access controlled room, for example.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on Japanese Patent Application No. 2004-013739 and Japanese Patent Application No. 2005-014817, and claims the benefit of the earlier filing date of Japanese Patent Application No. 2005-014817 filed on Jan. 21, 2005, the entire contents of which are hereby incorporated by reference.

What is claimed is:

1. A data processing system, comprising:

a read unit configured to read unique information identifying an individual from an individual identification medium that stores said unique information;

an input unit configured to capture the unique information read by the read unit and convert the unique information into digital unique information; and the database unit having registered digital unique information registered beforehand, the database unit being configured to register the digital unique information captured and converted by the input unit, wherein a managing process is performed on the digital unique information captured and converted by the input unit, the managing process involving comparing the digital unique information captured and converted by the input unit with the registered digital unique information registered in the database unit according to a predetermined rule, organizing the digital unique information captured and converted by the input unit according to the predetermined rule based on the read unit reading the unique information, and when the digital unique information captured and converted by the input unit corresponds to the registered digital unique information registered in the database unit, and registering the organized digital unique information in the database unit, the registered digital unique information being output to a predetermined output unit.

2. The data processing system as claimed in claim 1, wherein the database unit is arranged at a remote location with respect to the read unit and the input unit; and the database unit and the input unit are connected by a predetermined communication mechanism.

3. The data processing system as claimed in claim 2, further comprising:

an input side database unit arranged within or near the input unit which input side database unit is configured to store the digital unique information captured by the input unit;

wherein the digital unique information captured by the input unit is transmitted to the database unit via the communication mechanism, and stored in the input side database unit; and when the input side database unit and the database unit are connected, the digital unique information of the input side database unit and the digital unique information of the database unit are compared automatically or through manual operation, and one or more digital unique information items of the digital unique information of the database unit that are identical to one or more digital unique information items of the digital unique information at the input side database unit are stored in the database unit.

4. The data processing system as claimed in claim 2, further comprising:

an input side database unit configured to store the digital unique information captured by the input unit;

wherein the input side database unit is connected to the database unit via the connection mechanism, the digital unique information of the input side database unit is compared with the digital unique information of the database unit at predetermined time intervals, and the digital unique information of the database unit is arranged to match the digital unique information of the input side database unit.

5. The data processing system as claimed in claim 4, wherein the read unit is configured to read the unique information, and the input side database unit is configured to store the digital unique information corresponding to the unique information read by the read unit and captured by the input unit when the connection between the input side database unit and the database unit is disabled; and the digital unique information of the input side database unit and the digital unique information of the database unit are compared, and the digital unique information of the database unit is arranged to match the digital unique information of the input side database unit when communication between the input side database unit and the database unit is enabled.

6. The data processing system as claimed in claim 5, further comprising:

a plurality of the input units and a plurality of the input side database units arranged at the input units;

wherein the respective digital unique information of the input side database units are compared with each other at predetermined time intervals and arranged to be identical with each other; and the identical digital unique information of the input side database units and the digital unique information of the database unit are compared at predetermined time intervals, and the digital unique information of the database unit is arranged to match the identical digital unique information of the input side database units.

7. The data processing system as claimed in claim 4, further comprising:

a plurality of the input units that are connected to a same network;

wherein the input side database is connected to the same network to which the input units are connected; and the digital unique information of the input side database unit and the digital unique information of the database unit are compared, and information items of the digital unique information of the database unit that are identical to information items of the digital unique information of the input side database unit are stored in the database unit.

8. The data processing system as claimed in claim 7, further comprising:

a display unit arranged near the database unit which display unit is configured to establish communication with the input side database unit of the input unit and display the digital unique information stored in the input side database unit.

9. The data processing system as claimed in claim 2, further comprising:

an input side database unit configured to store the digital unique information captured by the input unit;

wherein when the input side database unit is connected to the database unit and the database unit detects a predetermined change, the database unit sends a request to the input side database unit for the digital unique information of the input side database unit, and arranges the digital unique information of the database unit to match the digital unique information of the input side database unit.

10. The data processing system as claimed in claim 9, wherein the read unit is configured to read the unique information, and the input side database unit is arranged to store the digital unique information corresponding to the unique information read by the read unit and captured by the input unit when the connection between the input side database unit and the database unit is disabled; and the digital unique information of the input side database unit and the digital unique information of the database unit are compared, and the digital unique information of the database unit is arranged to match the digital unique information of the input side database unit when communication between the input side database unit and the database unit is enabled.

11. The data processing system as claimed in claim 10, further comprising:

a plurality of the input units and a plurality of the input side database units arranged at the input units;

wherein the respective digital unique information of the input side database units are compared with each other at predetermined time intervals and arranged to be identical with each other; and the identical digital unique information of the input side database units and the digital unique information of the database unit are compared at predetermined time intervals, and the digital unique information of the database unit is arranged to match the identical digital unique information of the input side database units.

12. The data processing system as claimed in claim 9, further comprising:

a plurality of the input units that are connected to a same network;

wherein the input side database is connected to the same network to which the input units are connected; and the digital unique information of the input side database unit and the digital unique information of the database unit are compared, and information items of the digital unique information of the database unit that are identical to information items of the digital unique information of the input side database unit are stored in the database unit.

13. The data processing system as claimed in claim 12, further comprising:

a display unit arranged near the database unit which display unit is configured to establish communication with the input side database unit of the input unit and display the digital unique information stored in the input side database unit.

14. The data processing system as claimed in claim 2, wherein the read unit and the input unit are serially connected, and the input unit and the database unit are connected via an Ethernet network.

15. The data processing system as claimed in claim 1, wherein the input unit is configured to add input side identification data to the digital unique information corresponding to the unique information read by the read unit and digitally converted by the input unit, the input side identification data identifying at least one of said input unit and said read unit.

16. The data processing system as claimed in claim 1, wherein the read unit and the input unit are arranged near a door at an entrance of an access controlled room;

the read unit is operated by the individual to read the unique information from the individual identification medium;

the database unit is configured to receive the digital unique information corresponding to the unique information read by the read unit and digitally converted by the input unit, and transmit a superposed signal superposing an audio signal and an operations signal to the input unit; and the input unit is configured to output guidance information based on the audio signal of the superposed signal, and lock/unlock the door based on the operations signal of the superposed signal.

17. The data processing system as claimed in claim 1, wherein the organizing the digital unique information captured and converted by the input unit includes acquiring additional information regarding the digital unique information captured and converted by the input unit as acquired additional information;

adding the acquired additional information to the digital unique information captured and converted by the input unit.

* * * * *